United States Patent [19]

Morita et al.

[11] Patent Number: 4,937,214

[45] Date of Patent: Jun. 26, 1990

[54] PROCESS FOR PRODUCTION OF CRYSTAL GRAIN-ORIENTED CERAMICS

[75] Inventors: Mitsuhiko Morita; Yoshio Yoshimoto; Yasuhiko Toda, all of Ube, Japan

[73] Assignee: Ube Industries Co., Ltd., Ube, Japan

[21] Appl. No.: 354,552

[22] Filed: May 22, 1989

[30] Foreign Application Priority Data

May 24, 1988 [JP] Japan .................. 63-124945

[51] Int. Cl.$^5$ .............................................. C04B 35/18
[52] U.S. Cl. ................................... 501/127; 501/154; 501/94; 501/1
[58] Field of Search ................. 501/95, 127, 154, 94, 501/1; 264/63

[56] References Cited

U.S. PATENT DOCUMENTS

| 4,001,364 | 1/1977 | Suzuki | 264/63 |
| 4,384,046 | 5/1983 | Nakagani | 501/95 |

FOREIGN PATENT DOCUMENTS

| 917698 | 2/1963 | United Kingdom . |
| 1070902 | 6/1967 | United Kingdom . |
| 1097235 | 1/1968 | United Kingdom . |
| 1105566 | 3/1968 | United Kingdom . |
| 1123806 | 8/1968 | United Kingdom . |
| 1299490 | 12/1972 | United Kingdom . |
| 1327050 | 8/1973 | United Kingdom . |
| 1412890 | 11/1975 | United Kingdom . |

*Primary Examiner*—William R. Dixon, Jr.
*Assistant Examiner*—M. Sohn
*Attorney, Agent, or Firm*—Armstrong, Nikaido, Marmelstein, Kubovcik & Murray

[57] ABSTRACT

The present process is a process for preparation of crystalline grains-oriented ceramics which comprises orienting grains of ceramics raw material powder to a definite direction by applying centrifugal force on the grains and then burning the resulting grains. These ceramics are expected to be utilized, for example, as $\beta$- or $\beta''$-alumina solid electrolytes for use in sodium-sulfur cells and as magnetic anisotropic ferrite magnets for use in small-sized motors, speakers or the like.

3 Claims, No Drawings

PROCESS FOR PRODUCTION OF CRYSTAL GRAIN-ORIENTED CERAMICS

BACKGROUND OF THE INVENTION

1. Field of the Invention

The present invention relates to a process for preparation of ceramics wherein powder grains are oriented in a definite direction.

More specifically, the present invention relates to a process for preparation of a $\beta$- or $\beta''$-alumina solid electrolyte which is used in sodium-sulfur (Na-S) cells whose utilization for electric cars and for smoothing electric power load is expected and which is minute and has a high conductivity of sodium ion and an excellent mechanical strength; and a magnetic anisotropic polycrystalline sintered barium or strontium ferrite magnet for generating a strong magnetic field (hereinafter referred to as anisotropic ferrite magnet).

2. Related Art Statement $\beta$-Alumina is a substance generally represented by $Na_2O \cdot 11Al_2O_3$, belongs to the hexagonal system and has a structure of repeated one spinel block. $\beta$-Alumina is called a two-dimensional ion electroconductor since $Na^+$ ion can move only in the C-face perpendicular to the C-axis.

The electric resistance (specific resistance) in the C-face of $\beta$-alumina single crystal is excellent and $8\Omega \cdot cm$ at 300° C., and if a cylindrical or tabular material consisting of single crystals whose C-face is arranged to the direction to be electrified is used, a high electroconductivity can be obtained. However, cleavage at the C-face is liable to occur in $\beta$-alumina single crystal and thus there is a problem in view of mechanical strength and growth of single crystal is technically difficult, and thus it is difficult to practically use such a material.

Although it can be attained by preparing a polycrystalline body consisting of small crystal grains to enhance mechanical strength, in a polycrystalline body electric resistance is large at the interface of crystal grains and since the azimuth of each grain is irregular the direction of movement of $Na^+$ ions is different. Thus, electric current follow a zigzag course and electric resistance increases. For example, the specific resistance at 300° C. of a polycrystalline body prepared by sintering $\beta$-alumina is 20 to $100\Omega \cdot cm$ and fairly higher than that of single crystal, and thus in order to enhance the performance of Na-S cells it is necessary to reduce specific resistance.

$\beta''$-Alumina is a substance represented by $Na_2O \cdot 5Al_2O_3$, and the specific resistance of single crystalline body is 0.5 to 1 $\Omega \cdot cm$ and the specific resistance of sintered polycrystalline body is on the order of 5 to $8\Omega \cdot cm$. Although the specific resistance of $\beta''$-alumina is fairly improved compared to that of $\beta$-alumina, it is necessary to make specific resistance further decrease for further enhancement of the performance of Na-S cells.

Usual method for reducing the resistance of $\beta$- or $\beta''$-alumina solid electrolyte is a method of thinning the thickness of the solid electrolyte which functions as a passage of $Na^+$ ions. Although solid electrolyte having a thickness of about 1mm is now prepared, it is difficult in view of mechanical strength to prepare solid electrolyte having a thickness of 1mm or less and the reduction of resistance is hardly expected by a method of thinning the thickness of the solid electrolyte.

M type hexagonal system ferrite such as barium ferrite or strontium ferrite is powder consisting of hexagonal tabular fine grains which have C-axis as an axis of easy magnetization and have a developed C-face. Although anisotropic ferrite magnets wherein this powder is oriented are widely used as a permanent magnet for magnetic circuit, in accordance with recent request for miniaturization and/or performance enhancement of speakers, small-sized motors, etc., enhancement of the magnetic characteristics of ferrite magnets is strongly desired.

Particularly, in order to generate a strong magnetic field in magnetic circuits using an anisotropic ferrite magnet, high residual magnetic flux density (Br) and high coercive force (Hc) are desired.

Barium ferrite or strontium ferrite is usually used as an anisotropic ferrite magnet, and its residual magnetic flux density (Br) is on the order of 4.0 to 4.4 KG and its coercive force (Hc) is on the order of 2.8 to 3.3 KOe. Although in order to make the above desire possible the improvement (magnetic field press molding) of ferrite composition and/or orientation method of ferrite grains has been carried out, satisfactory magnetic characteristics have not been obtained.

SUMMARY OF THE INVENTION

An object of the present invention lies in providing ceramics wherein crystalline grains are oriented and which have an excellent functionality which so far never been attained and are prepared by orienting ceramics raw material grains to a definite direction utilizing centrifugal force and then burning them.

The above object of the present invention can be accomplished by preparing a ceramics compact wherein C-faces are oriented in a definite direction, utilizing the nature that the C-faces of thin tabular or leaf-like tabular ceramics powder are oriented perpendicularly to the direction of stress.

BRIEF DESCRIPTION OF THE DRAWINGS

The present invention will be described with reference to the accompanying drawings, wherein.

DETAILED DESCRIPTION OF THE INVENTION

Figure 1:
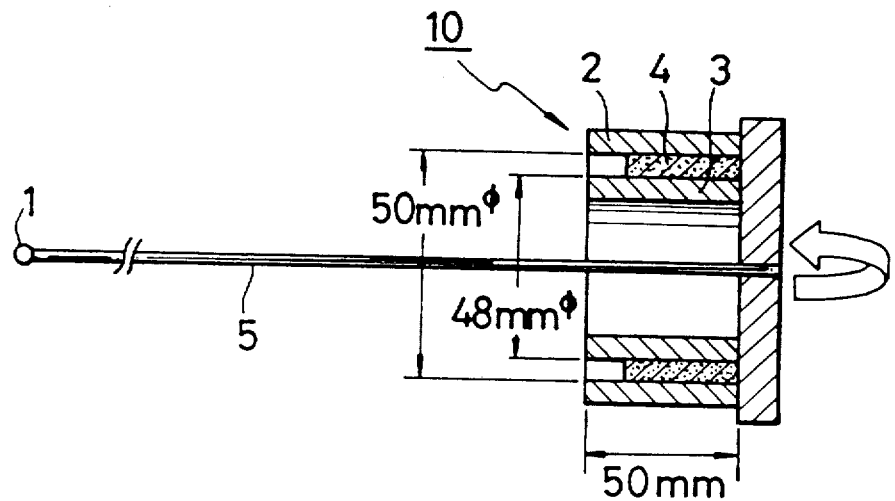
FIG. 1 is the longitudinal cross-sectional front elevation indicating a method of preparation of the compact of Example 1 and the molding flask.

Although $\beta$- or $\beta''$-alumina or barium or strontium ferrite is used as ceramics raw material powder to be used in the present invention, cordierite, which is thin tabular or leaf-like tabular kaolin or talc, can additionally be used as a part of the raw material constituting the ceramics raw material powder.

Although there is no particular restriction about ceramics raw material powder to be used as a raw material, it is preferred that this powder is as fine as possible in order to enhance the mechanical strength and specifically 0.1 to 1.0 $\mu m$, particularly 0.2 to 0.6 $\mu m$ taking handling property and molding property into account. Further, although there is no particular restriction about a binder to be used for molding, paraffin, polyethylene glycol, methylcellulose, ethylcellulose and polyvinylbutyral are, for example, be used.

The preparation method of the present invention is described below.

Ceramics raw material powder which has previously been admixed with a binder is filled into a molding flask, centrifugal force of preferably 250 kg/cm$^2$ or more, more preferably 350 kg/cm$^2$ or more, most preferably 400 kg/cm$^2$ or more is applied onto the contents to prepare a compact wherein the C-faces of the ceramics raw material powder are oriented perpendicularly to the direction of stress, and the compact is taken out of the molding flask. After the removal of the molding flask, the compact is gradually heated to 500° to 600° C. to remove the binder.

As for the burning of β- or β″-alumina compact, the compact is burned in a closed vessel, e.g. in a magnesia crucible at 1500° to 1700° C., preferably at 1550° to 1650° C. to prepare a β- or β″-alumina solid electrolyte. When the burning temperature is lower than 1500° C., sufficient minuteness cannot be attained to form solid electrolyte having only a low mechanical strength, and when the burning temperature higher than 1700° C. is adopted, alkali (Na$_2$O) in the β- or β″-alumina powder is volatilized and as a result transition to α-alumina occurs, and thus desired electrolyte cannot be obtained.

On the other hand, the burning of a barium ferrite or strontium ferrite compact is carried out in an oxidizing atmosphere at 1000° to 1350° C., preferably at 1100° to 1300° C. to prepare an anisotropic ferrite magnet.

When burning temperature is lower than 1000° C., sufficient minuteness cannot be attained and only a magnet having a lot of cavities is obtained. When the burning is carried out at a temperature higher than 1350° C., grain growth predominantly takes place compared to minuteness and thus the enhancement of magnetic characteristics which is an object of the present invention cannot be attained.

Centrifugal force to be applied onto ceramics raw material powder in the present invention depends on the kind of the raw material powder, and is preferably 250 kg/cm$^2$ or more, more preferably 350 kg/cm$^2$ or more, most preferably 400 kg/cm$^2$ or more for forming sufficient orientation of powder grains. Although there is no particular upper limit thereby, the order of 1000 kg/cm$^2$ becomes a limit in view of the apparatus to be used.

When the raw material powder is β- or β″-alumina powder, it is preferable to apply a centrifugal force of 400 kg/cm$^2$ or more, and when the raw material powder is barium ferrite powder or strontium ferrite powder, it is preferable to apply a centrifugal force of 350 kg/cm$^2$ or more. Further, in case of cordierite powder, it is preferable to apply a centrifugal force of 250 kg/cm$^2$ or more.

Although there if no particular restriction about the sintering apparatus and any of sintering apparatuses such as an electric furnace and gas furnace can properly be used, it is preferable to use an apparatus capable of temperature control.

[EXAMPLE]

The present invention is further detailedly described based on examples, but not restricted thereto.

EXAMPLE 1

95 weight % of β-alumina powder having an average grain size of 0.2 βm and 5 weight % of Na$_2$CO$_3$ were admixed with a binder (paraffin and methylcellulose), and the mixture was filled into a cylindrical molding flask 10 consisting of an outer frame 2 and an inner frame 3 having an outer diameter of 50 mmφ, an inner diameter of 48 mmφ and a height of 50 mm. A centrifugal force of 500 kg/cm$^2$ was applied onto the contents by rotating this molding flask 10 to the direction indicated in the figure around the fulcrum 1 of rod 5 as the center to prepare a compact having a composition of β-alumina. After the removal of the molding flask, the binder was removed at 600° C. and burning at 1600° C. for one hour was carried out in a magnesia crucible to prepare a tubular β-alumina solid electrolyte.

The orientation degree F. of the β-alumina solid electrolyte on the face perpendicular to the direction of centrifugal force as determined according to the X-ray diffraction method was 0.82 and the specific resistance of thickness direction was 12Ω·cm.

Orientation degree F. of the β-alumina solid electrolyte according to the X-ray diffraction method depends on the method of F. K. Lotgering (J. Inorg. Nucl. Chem. 9, 113–123 (1959)).

$$F = (P - Po)/(1 - Po)$$

$$P = \Sigma I(001)/\Sigma I(hkl)$$

$\Sigma I(001)$: Sum of X-ray diffraction strength on (001) face $\Sigma I(hkl)$: Sum of X-ray diffraction strength on (hkl) face $P = P$ of the oriented sample $Po = P$ of the non-oriented sample

EXAMPLE 2

95 weight % of β″-alumina powder having an average grain size of 0.2 μm and 5 weight % of Na$_2$CO$_3$ were admixed with a binder and then tubular β″-alumina solid electrolyte was prepared in the same manner as in Example 1.

The orientation degree F. of the β″-alumina solid electrolyte on the face perpendicular to the direction of centrifugal force as determined according to the X-ray diffraction method was 0.85 and the specific resistance of thickness direction was 2 Ω·cm.

COMPARATIVE EXAMPLE 1

95 weight % of β-alumina powder having an average grain size of 0.2μm and 5 weight % of Na$_2$CO$_3$ were admixed with a binder, and the mixture was filled into a cylindrical molding flask having an outer diameter of 50 mm, an inner diameter of 48 mm and a height of 50 mm. 300 kg/cm$^2$ of centrifugal force was applied onto the contents to prepare a compact having a β-alumina composition. Subsequent procedures were carried out in the same manner as in Example 1 to prepare a β-alumina solid electrolyte, and the orientation degree F. and specific resistance of thickness direction thereof were measured.

Orientation degree F. was 0.36 and specific resistance of thickness direction was 30 Ω·cm.

EXAMPLE 3

Strontium ferrite powder (100 weight %) having an average grain size of 0.2 μm was admixed with a binder and filled into a cylindrical molding flask having an inner diameter of 40 mm and a height of 50 mm. A centrifugal force of 400 kg/cm$^2$ was applied onto the contents while an external magnetic field was applied in order to further enhance the orientation of the powder grains, whereby molding was carried out. After the removal of the molding flask, the binder was removed at 600° C. and burning was carried out in an oxidizing atmosphere at 1250° C. for 2 hours to prepare an anisotropic strontium ferrite magnet The characteristics of this magnet were residual magnetic flux density (Br) of 5.0 KG and coercive force (Hc) of 4.0 KOe and superior to those of an anisotropic strontium ferrite magnet as prepared according to a usual preparation method using a magnetic field press having a residual magnetic flux density (Br) of 4.0 to 4.4 KG and a coercive force (Hc) of 2.8 to 3.3 KOe.

The present invention relates to a simple and convenient process for preparing crystalline grains-oriented ceramics having an excellent function which so far never been attained characterized by applying centrifugal force to ceramics raw material powder grains to orient the grains to a definite direction and then burning them. Therefore, it can be expected that the present process is utilized for the preparation of $\beta$- or $\beta''$-alumina solid electrolytes for sodium-sulfur cells and magnetic anisotropic ferrite magnets and the like, and thus the process of the invention has an extremely high industrial value.

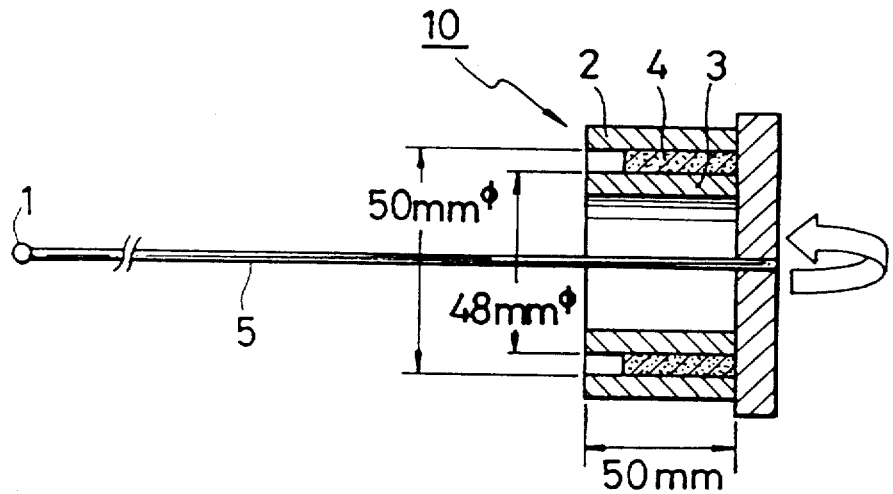

What is claimed is:

1. A process for preparing crystalline grain oriented ceramics comprising the steps of:
   mixing grains of ceramic raw material powder with a binder;
   applying centrifugal force by a rotating means to orient perpendicularly, to the direction of the stress, the C-faces of the grains of powder;
   then burning the resulting grains of ceramic raw material powder by first heating to remove the binder, and then burning at a temperature determined by the choice of raw material.

2. A process of claim 1, wherein the shape of the grains of ceramics raw material powder is thin tabular or leaf-like tubular.

3. A process of claim 1 or 2, wherein the ceramics raw material powder is at least one of $\beta$- or $\beta''$-alumina, barium ferrite and strontium ferrite.

* * * * *

UNITED STATES PATENT AND TRADEMARK OFFICE
CERTIFICATE OF CORRECTION

PATENT NO. : 4,937,214
DATED : June 26, 1990
INVENTOR(S) : Morita, et al

Figure 2:
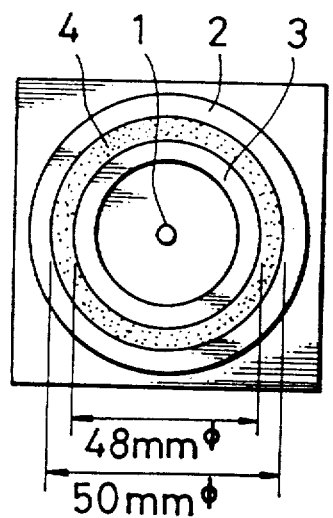
FIG. 2 is the left side elevation of FIG. 1.

It is certified that error appears in the above-identified patent and that said Letters Patent is hereby corrected as shown below:

The title page should be deleted to appear as per attached title page.
The drawing sheet, consisting of Fig. 1 and 2, should be added
as show on the attached sheet.

Signed and Sealed this

Eighteenth Day of June, 1991

Attest:

HARRY F. MANBECK, JR.

Attesting Officer

Commissioner of Patents and Trademarks

United States Patent [19]

Morita et al.

[11] Patent Number: 4,937,214
[45] Date of Patent: Jun. 26, 1990

[54] PROCESS FOR PRODUCTION OF CRYSTAL GRAIN-ORIENTED CERAMICS

[75] Inventors: Mitsuhiko Morita; Yoshio Yoshimoto; Yasuhiko Toda, all of Ube, Japan

[73] Assignee: Ube Industries Co., Ltd., Ube, Japan

[21] Appl. No.: 354,552

[22] Filed: May 22, 1989

[30] Foreign Application Priority Data

May 24, 1988 [JP] Japan ................... 63-124945

[51] Int. Cl.$^5$ ............................................. C04B 35/18
[52] U.S. Cl. .................................. 501/127; 501/154; 501/94; 501/1
[58] Field of Search ................... 501/95, 127, 154, 94, 501/1; 264/63

[56] References Cited

U.S. PATENT DOCUMENTS

| 4,001,364 | 1/1977 | Suzuki | 264/63 |
| 4,384,046 | 5/1983 | Nakagani | 501/95 |

FOREIGN PATENT DOCUMENTS

| 917698 | 2/1963 | United Kingdom . |
| 1070902 | 6/1967 | United Kingdom . |
| 1097235 | 1/1968 | United Kingdom . |
| 1105566 | 3/1968 | United Kingdom . |
| 1123806 | 8/1968 | United Kingdom . |
| 1299490 | 12/1972 | United Kingdom . |
| 1327050 | 8/1973 | United Kingdom . |
| 1412890 | 11/1975 | United Kingdom . |

Primary Examiner—William R. Dixon, Jr.
Assistant Examiner—M. Sohn
Attorney, Agent, or Firm—Armstrong, Nikaido, Marmelstein, Kubovcik & Murray

[57] ABSTRACT

The present process is a process for preparation of crystalline grains-oriented ceramics which comprises orienting grains of ceramics raw material powder to a definite direction by applying centrifugal force on the grains and then burning the resulting grains. These ceramics are expected to be utilized, for example, as $\beta$- or $\beta''$-alumina solid electrolytes for use in sodium-sulfur cells and as magnetic anisotropic ferrite magnets for use in small-sized motors, speakers or the like.

3 Claims, 1 Drawing Sheet